(12) United States Patent
Price

(10) Patent No.: US 6,604,898 B2
(45) Date of Patent: Aug. 12, 2003

(54) VEHICULAR CARGO ANCHOR

(76) Inventor: Brent A. Price, 1211 Bonfoy Ave., Colorado Springs, CO (US) 80909

( * ) Notice: Subject to any disclaimer, the term of this patent is extended or adjusted under 35 U.S.C. 154(b) by 0 days.

(21) Appl. No.: 09/759,545

(22) Filed: Jan. 12, 2001

(65) Prior Publication Data

US 2001/0002973 A1 Jun. 7, 2001

Related U.S. Application Data

(63) Continuation-in-part of application No. 09/429,064, filed on Oct. 29, 1999, now Pat. No. 6,196,777.

(51) Int. Cl.[7] .................................................. B60P 7/08
(52) U.S. Cl. ........................ 410/102; 410/101; 410/106; 410/110
(58) Field of Search ................. 410/101, 102, 410/106, 110, 116; 24/115 K, 265 CD; 248/499

(56) References Cited

U.S. PATENT DOCUMENTS

| | | | | |
|---|---|---|---|---|
| 2,609,761 A | * | 9/1952 | Clark | 410/101 |
| 4,850,770 A | * | 7/1989 | Millar, Jr. | 410/110 |
| 4,953,820 A | * | 9/1990 | Yoder | |
| 5,738,471 A | * | 4/1998 | Zentner et al. | 410/110 |
| 5,915,900 A | * | 6/1999 | Boltz | 410/110 |
| 6,000,890 A | * | 12/1999 | Macias | 410/116 |
| 6,039,520 A | * | 3/2000 | Cheng | 410/106 |
| 6,050,763 A | * | 4/2000 | Swailes | 410/107 |
| 6,129,490 A | * | 10/2000 | Erskine et al. | 410/110 |
| 6,196,777 B1 | * | 3/2001 | Price | 410/102 |
| 6,270,301 B1 | * | 8/2001 | Dunlop | 410/115 |
| 6,350,089 B1 | * | 2/2002 | Tekavec | 410/106 |

* cited by examiner

Primary Examiner—Stephen T. Gordon
(74) Attorney, Agent, or Firm—Richard W. Hanes; Hanes & Schutz, P.C.

(57) ABSTRACT

A cargo anchor primarily intended for attachment to the upper edge of the side of an open bed truck, comprising a journal box and an integral clamping apparatus. The journal box comprises a base member, a cleat superimposed on the base member and screws for interconnecting the cleat to the base member. A transverse bore in at least one of either the base member or the cleat is disposed parallel to the planes of the base member and the cleat and is sized to carry a shaft or a "D" ring that functions to support load binding straps or ties. Integral with the journal box is a clamping device for attaching the journal box to a flat structural member.

25 Claims, 9 Drawing Sheets

US 6,604,898 B2

VEHICULAR CARGO ANCHOR

This application is a continuation-in-part of U.S. application Ser. No. 09/429,064, filed Oct. 29, 1999, now U.S. Pat. No. 6,196,777 B1.

The present invention relates to an implement that is attachable to a load carrying vehicle and is operative to secure or hold loads carried in the vehicle.

BACKGROUND

Vehicles such as pick-up trucks are incapacitated in their ability to accommodate cargo securing straps or lines because the sides of the truck bed are rarely, if ever, provided with sufficient rings, rails, brackets or holes by which a cargo securing strap can be anchored to the vehicle.

In some instances it is desirable to tie bulky cargo so that it will not move around in the bed of the truck or worse, leave the vehicle. In some instances it is desirable to position and hold certain types of loads in order to make room for other cargo, for example securing a bicycle in an upright position next to the side of the truck bed. Neither of these occasions are well served by the absence of anchoring facilities on pick-up trucks or similar vehicles.

It is, therefore, the primary object of the present invention to provide a universal cargo anchoring device that is readily attachable to the rolled upper edge of the side of a pick-up truck, dump truck or similar vehicle.

Secondarily, it is an object of the invention to provide a universal load anchoring device that can be attached to other portions of a vehicle or even a non moving structure.

Another object of the invention is to provide an anchor attachable to a structure, including a vehicle, that will support a shaft, axle or the like for the mounting of pivotal structures.

Other and still further objects, features and advantages of the present invention will become apparent upon a reading of the following detailed description of a preferred and alternative embodiments of the invention.

SUMMARY OF THE INVENTION

The cargo anchoring implement of the present invention comprises a journal box for a shaft and an integral screw operated clamping device for attaching the journal box to a supporting structure, such as, for example, the side of the bed of a pick-up or dump truck. In this specification and the concluding claims, the anchoring device will be explained in terms of its intended use with an open bed truck such as a pick-up truck, but the general explanation is intended to include all such types of trucks that have upstanding bed sides that can present a purchase area for the clamping part of the anchoring device. The rolled or bent over upper edges of the sides of the open bed of a pick-up truck provided the exemplar to explain the various embodiments of the invention. The anchoring device can also be utilized on fixed structures.

The journal box includes a base member and an adjustable pressure cleat that is superimposed on the base member. The base member functions not only as part of the journal box but also as part of the clamping device. A bore traverses the journal box and is located so that a shaft journalized in the bore and sandwiched between the base member and the cleat can, depending on the diameter of the shaft and the adjustment of the pressure exerted by the cleat, be allowed to rotate and move longitudinally within the bore or be locked in a selected rotational and longitudinal position within the bore. The shaft serves to support pivotally rotatable load carrying rack elements or to hold load fastening means such as a strap, line, band, chain, rope, belt or to hold a ring for receiving such items.

DETAILED DESCRIPTION

Figure 1:
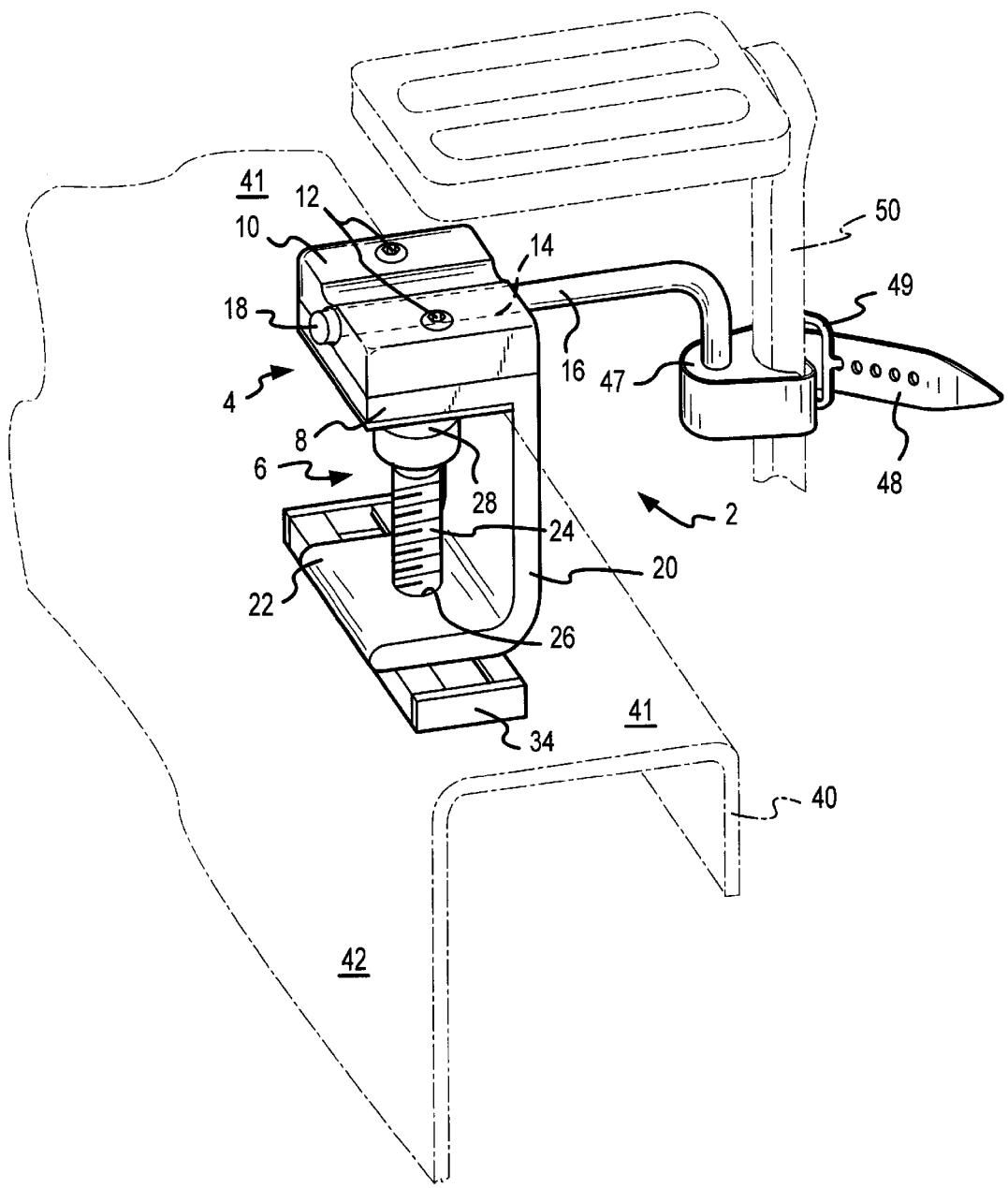
FIG. 1 is a perspective view of the anchoring device of the present invention as it would appear attached to the rolled, or bent over, upper edge of the side of the bed of a pick-up truck (shown fragmentarily in dotted lines). The crank arm and pedal of a bicycle loaded into the truck bed is fragmentarily shown in dotted lines.
Figure 2:
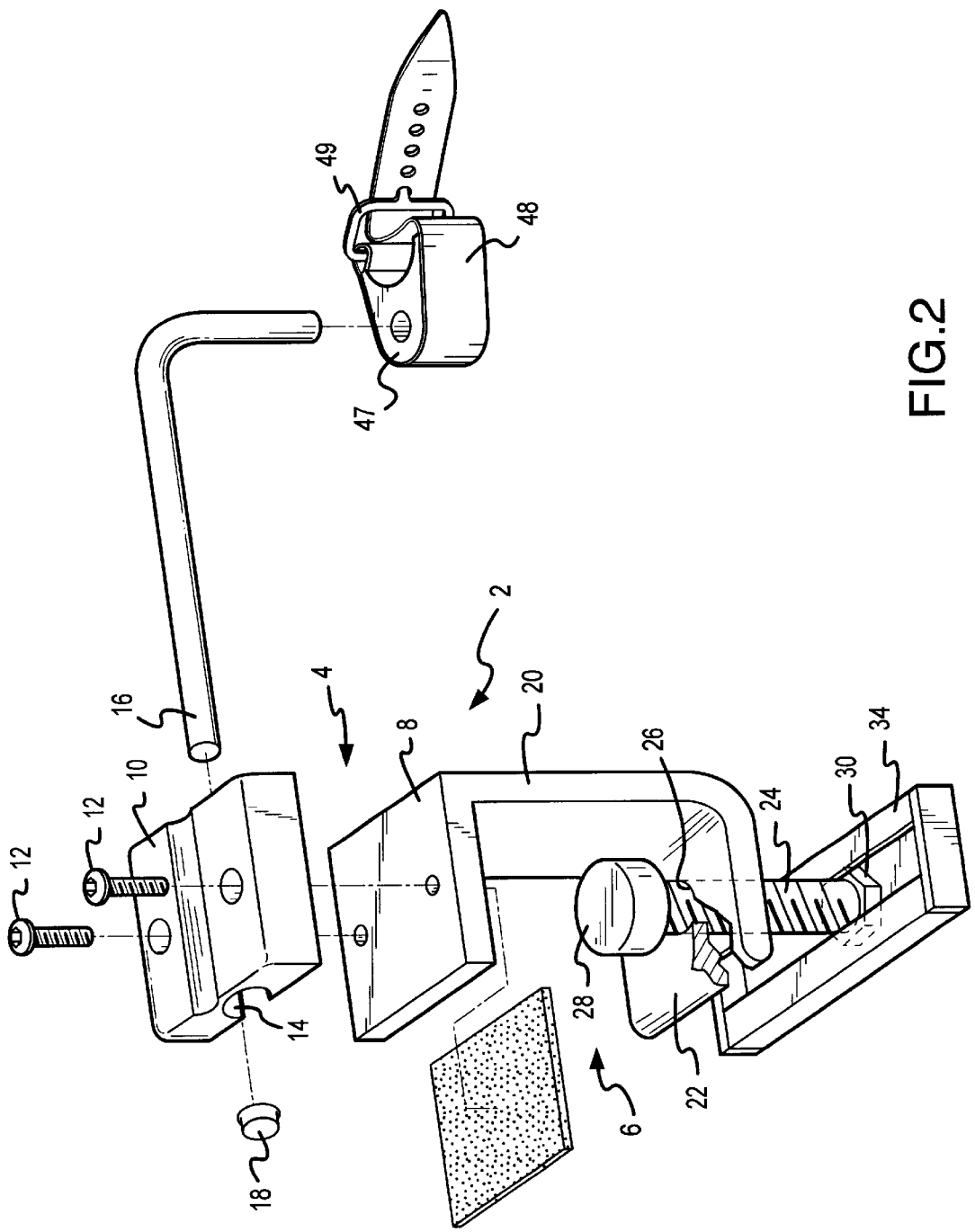
FIG. 2 is an exploded view of the anchor shown in FIG. 1.

For a detailed description of the various embodiments of the invention, we turn first to FIGS. 1 and 2. The preferred form of the anchor 2 comprises a journal box 4 and an integral clamping device 6. The journal box 4 includes a flat base member 8 and a superimposed cleat 10 that is adjustably secured to the base member by a pair of screws 12. The cleat 10 is provided with a transverse bore 14 that journals a cylindrical shaft 16. The shaft is sized and dimensioned so that the pressure exerted by the cleat 10 to sandwich the shaft between the cleat and the base member 8 can be adjusted to either lock the shaft in a fixed position or permit the shaft to both rotate and move longitudinally. An end cap 18 attached to the end of the shaft 16 prevents the shaft from being pulled through the journal box bore 14.

Integral with and depending from one side of the journal box's base member 8 is a rigid flattened and elongated member that can be characterized as the upright stem 20 of the letter "C." The base member 8, the stem 20 and an integral, laterally extending platform 22, that is parallel with the base member 8, constitutes the frame of a "C" clamp. The operative mechanism that cooperates with the "C" shaped frame includes a threaded screw 24 that threadingly engages an aperture 26 in the laterally extending platform 22. The screw is provided with a bearing pad 28 on the inner end thereof and a head 30 on the outer end thereof. A handle 34, or finger tab, is functionally attached to the outer end of the screw, preferably utilizing the head 30 to fit into a channel shaped handle member, as shown in FIGS. 1 and 2.

The generally "C" shaped frame of the clamp 6 is specifically designed to fit over at least a portion of the flat bent over upper extremity 41 of the side 42 of the bed of a pick-up truck and around the down turned inside edge 40 thereof. The threaded clamping screw 24 and the cushioning pad 28 are adapted to operatively engage the underside of the flat bent over upper extremity 41 when the screw is tightened. The clamping action provided by the combination of the base member engaging the top surface of the bent over edge 40 and the screw contacting the underside of the bent over edge secures the journal box to the upper edge of the truck bed.

The shaft 16 is shaped to accommodate the type of load to be anchored. The shaft 16 of the embodiment of FIGS. 1 and 2 includes an end portion that is bent 90° to the axis of the shaft. This transverse "L" shape accommodates the attachment of a rubber grommet 47 that serves as the base for a strap 48 and a buckle 49. The strap 48 encircles the crank arm 50 of a bicycle pedal assembly to tightly secure the bicycle that is standing on the floor of the truck bed against the inside of the side of the truck bed. If more than one anchor point is desired, another anchor of the same type may be used to tie down one of the frame members of the bicycle. Depending on the size, shape and design of the bicycle, it may be necessary or convenient for the combination of the grommet 47 and strap 48 to be closer to or farther away from the down turned upper edge of the bed side. By loosening the screws 12 and relieving the sandwiching pressure on the shaft 16, the shaft may be rotated or moved longitudinally to position it and the lateral end thereof in a position of maximum convenience for wrapping the strap 48 around structural member of the load.

Figure 3:
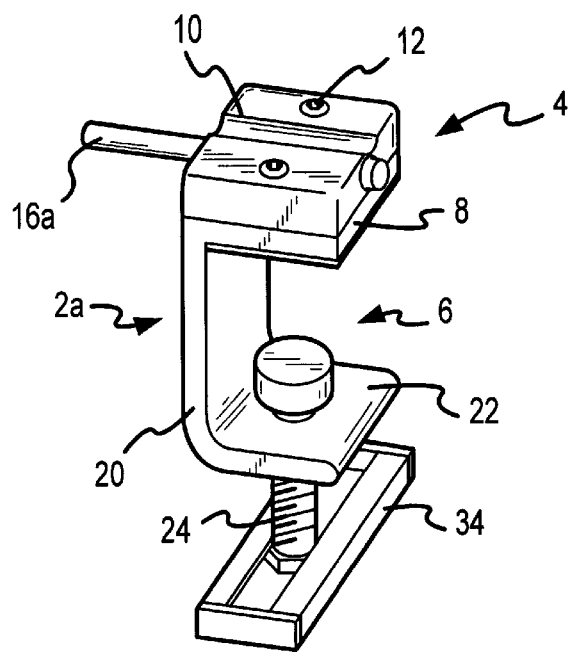
FIG. 3 is a perspective view of the anchor of the present invention with a straight shaft journaled by the journal box.
Figure 4:
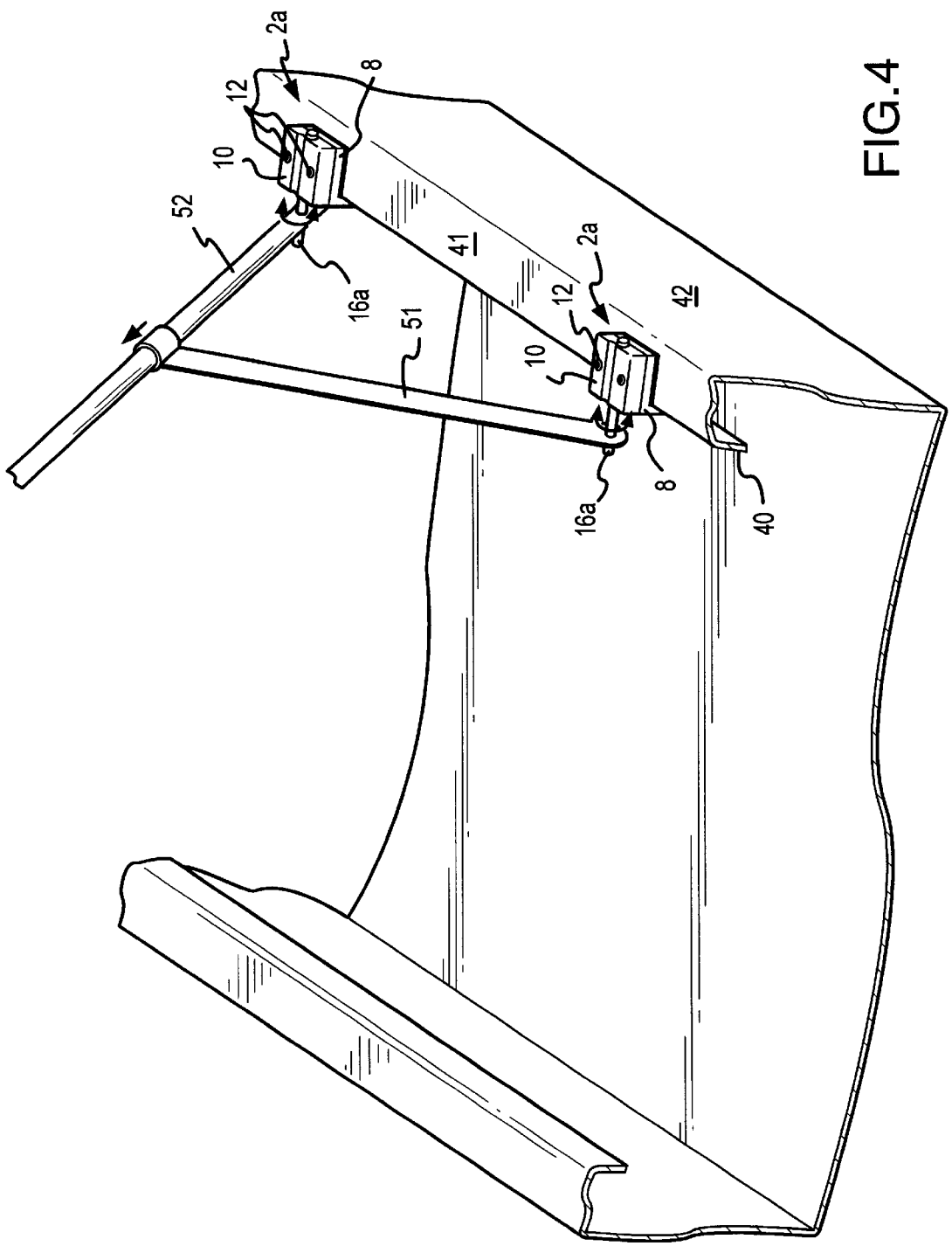
FIG. 4 is a fragmentary perspective view of the bed and lateral sides of a pick-up truck with a fragmentary view of the lower braces of a collapsible cargo rack that are mounted for pivotal movement on the shaft of the anchor embodiment shown in FIG. 3. The anchors of FIG. 3 are shown for illustrative purposes as mounted on only one side of the bed of the truck, however, in practice, the anchors and braces would normally be on both sides.

FIGS. 3 and 4 disclose an anchor 2a similar to that of FIGS. 1 and 2 except that the shaft 16a is straight instead of having a bent end portion. The straight shaft is advantageous for attaching the pivotal members of the cargo carrying rack, such as that that might support a boat or similar load over the bed of a pick-up truck. In the illustration of FIG. 4 two bracing members 51 and 52 of a rack are shown pivotally mounted on the inner ends of the shaft 16a of two spaced apart anchors 2 of the present invention. Each of the anchors is clamped to the flat bent over upper extremity 41 of the side 42 of the bed of a pick-up truck. Each of the separate shafts 16a of the two anchors 2a can be adjusted by the journal box screws 12 to be non-rotatable or rotatable, depending on the operative nature of the braces or rack members that are attached to it.

Figure 5:
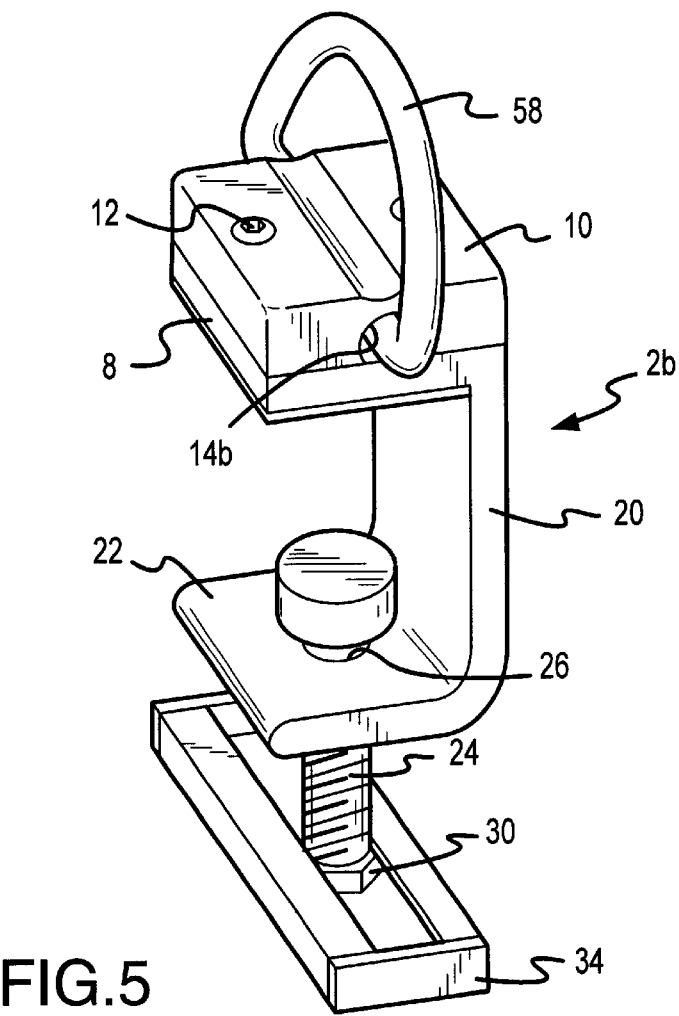
FIG. 5 is a perspective view of a third embodiment of the anchor. A "D" ring is rotatably secured in a transverse bore in the journal box.

FIG. 5 illustrates a third embodiment of the clamp 2b that utilizes a "D" ring 58 to hold a strap, rope, belt or other kind of load securing tie. In this embodiment the longitudinal axis of the transverse bore 14b is oriented ninety degrees from the position of the bore on the other described embodiments. The respective diameters of the bore 14b and the stem of the "D" ring 58 are such that the stem of the ring is freely rotatable within the bore when the journal-adjusting screws 12 are tightened. This freedom of rotation allows the "D" ring to move in response to the necessary direction of the tie strap which is dependent on the location and size of the load.

There may be instances where it is not possible to engage the turned down inside edge of the flat upper extremity of the side of the truck bed with a "C" clamp type of clamping device 6, as shown in FIGS. 1–5. Such an impediment would occur with the use of a full bed liner that follows the sides of the truck bed upwardly from the surface of the bed and projects outwardly to cover at least a portion of the flat upper extremity 41. Such a bed liner would prohibit the entry of a "C" clamp type of device around the upper edge structure to which the clamp is to be secured.

Figure 6:
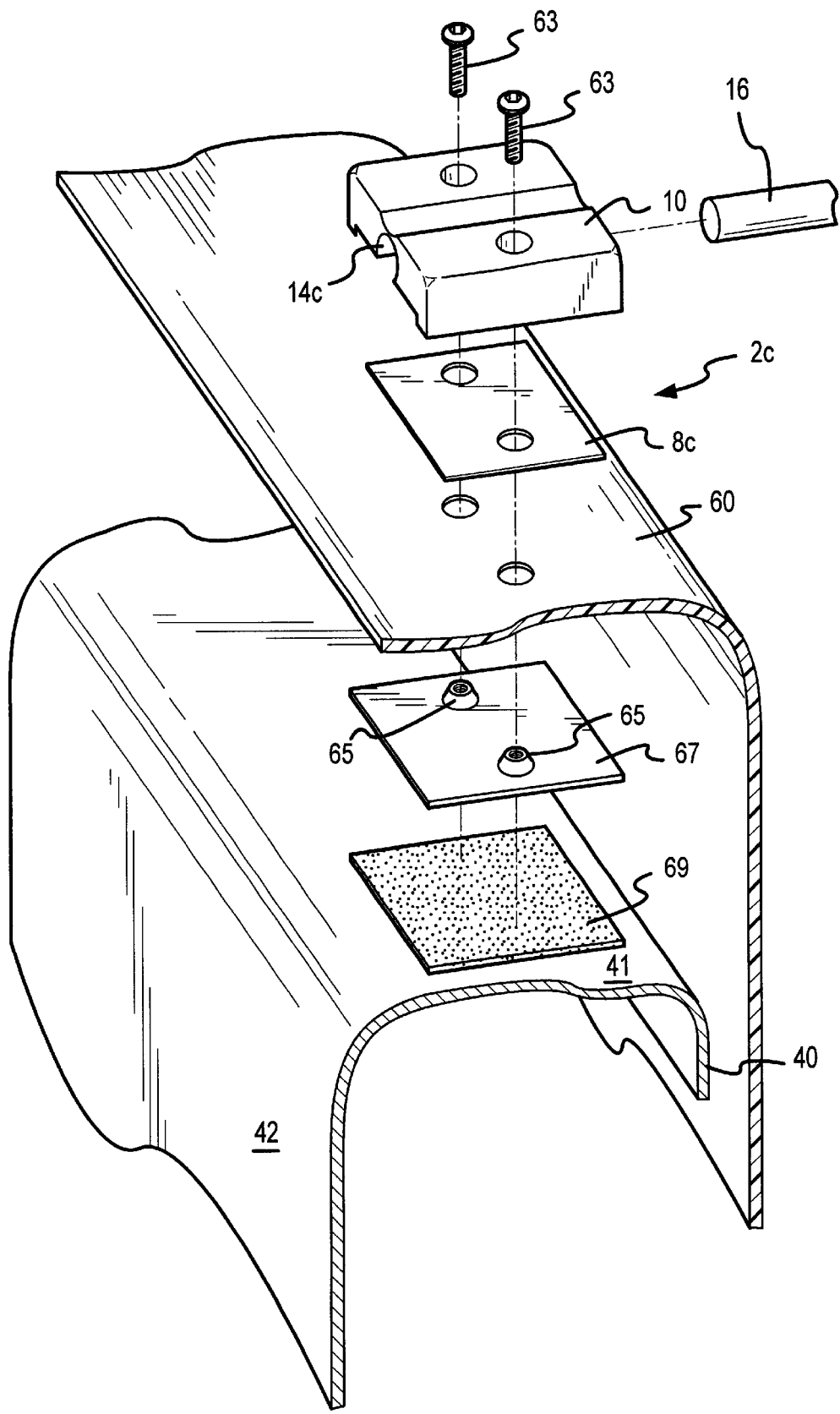
FIG. 6 is an exploded view of a further embodiment of the anchor of the present invention with a screw activated clamping plate that attaches to the top of the bed liner instead of the "C" type clamp utilized by the forgoing described embodiments. The side of the bed of the pick up truck and the bed liner are fragmentarily shown.
Figure 7:
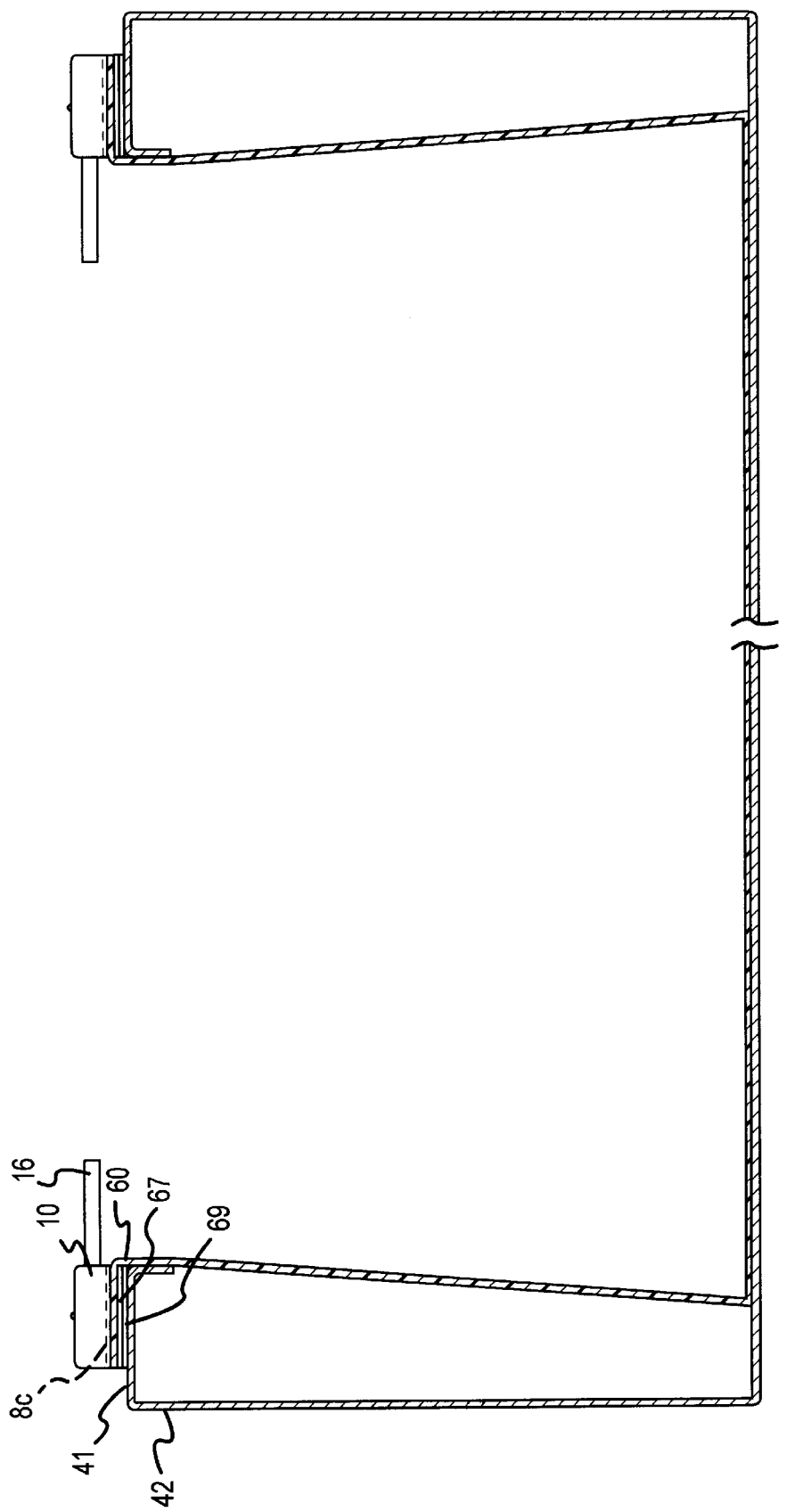
FIG. 7 is a cross sectional view of the bed of a pick up truck having a bed liner. The anchor embodiment shown in FIG. 3 is shown attached to the top edge of the bed liner, as more fully shown in FIG. 6.
Figure 8:
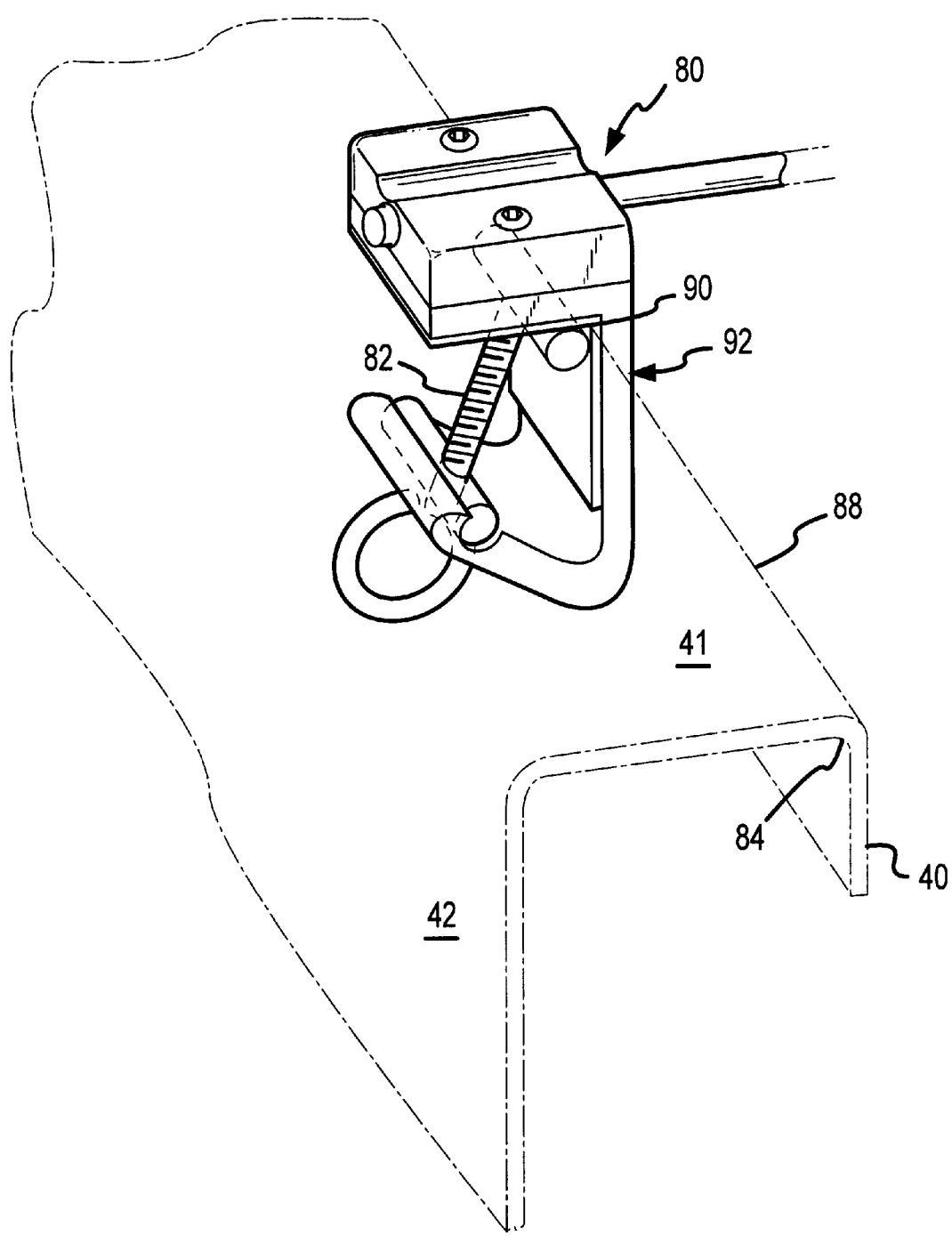
FIG. 8 is a perspective view of another embodiment of the anchor clamp of the present invention with the rolled, or bent over, upper edge of the side of the bed of a pick-up truck to which the anchor may be applied shown in dotted lines.

FIG. 6 describes an alternative embodiment of the clamping device that overcomes the problem of inaccessibility of a "C" clamp. This embodiment avoids the necessity of making holes in the flat upper extremity 41 by providing a means for attaching the journal box directly to the outwardly turned edge of the bed liner 60. In this alternative embodiment, the base member 8c of the journal box does not require the mass associated with the base member being part of the "C" clamp, as in the embodiment of FIGS. 1–5. As in the preferred embodiment, the cleat 10 is superimposed over the base member 8c and is provided with a transverse bore 14c which, with the base member 8c, journals a shaft 16, or a "D" ring, similarly to the other embodiments. A pair of fastening and pressure adjusting screws 63 penetrate the cleat 10, the base member 8c, the bed liner 60 and threadingly engage a pair of nuts 65 attached to a clamping plate 67. The clamping plate is positioned on the underside of the outwardly turned edge of the bed liner. Thus, by tightening the adjusting screws 63 the anchor 2c will be secured to the rigid bed liner structure. In this alternative embodiment of the clamping structure, the shaft or "D" ring choices are the same as those for the "C" clamping embodiment. A rubber or felt pad 69 is preferably positioned between the clamping plate 67 and the flat upper extremity 41 of the side of the truck bed in order to insulate the paint on the truck bed from being damaged by contact with the clamping plate 67.

FIGS. 8–12 illustrate a further embodiment 80 of the inventive anchor clamp. This version is especially useful where the top 41 of the side 42 of the truck bed comprises spaced apart upper and lower levels of sheet metal. With such a construction, a clamp of the type shown in FIGS. 1–5 tends to crush the box formed by the two layers of sheet metal, forming a dent in the top 41 of the truck bed side 42.

To eliminate the crushing tendency, while at the same time providing a clamping force that contains both side and vertically directed force vectors to restrain the load, the threaded stem 82 of the anchor clamp 80 is directed into the corner bend 84 of the sheet metal forming the down-turned inside edge 40 of the truck bed side 42. Preferably, the distal end of the stem 82 is fitted with a pad 86 that, at least to some extent, can conform to the shape of the inside corner against which it presses. If the inside shape of the corner is curved, then such a pad would preferably comprise a curved outer surface, such as contained in a cylinder 86 shown in FIGS. 8–12. If the inside corner is prone to more of a right angle, then a triangular shaped pad (not shown) is preferred.

Inasmuch as the outside corner 88 of the bend between the side-forming sheet metal 40 and the top edge 41 of the truck bed defines a right angle, the inside corner 90 of the clamp frame 92 is preferably also a substantially conforming right angle. Extending outwardly from the inside corner 90 and covering a substantial portion of the inside surfaces of the side wall 94 and the upper leg 96 is an optional pad 115 of rubber, felt or similar material that will protect the outside surface of the top 41 and the side 40.

The body of the clamp of this embodiment is similar to the body of the clamps illustrated in FIGS. 1–5 to the extent that the body 92 comprises a frame, generally defining a "C" shape. Such a frame includes an upright portion, or a side wall 94, having first and second spaced apart unilaterally projecting legs 96 and 98. The upper leg 96 has previously, in the FIGS. 1–5 embodiments, been referred to as the base member 8. The upper leg 96 has the same function and purpose as the base member 8 of the earlier embodiments insofar as serving as the foundation for the fastening cleat 10. However, because the leg 96 does not co-act with the threaded clamping stem in the same way as does the base member 8, the leg 96 is described as a distinct element related to this embodiment of the clamp.

Figure 9:
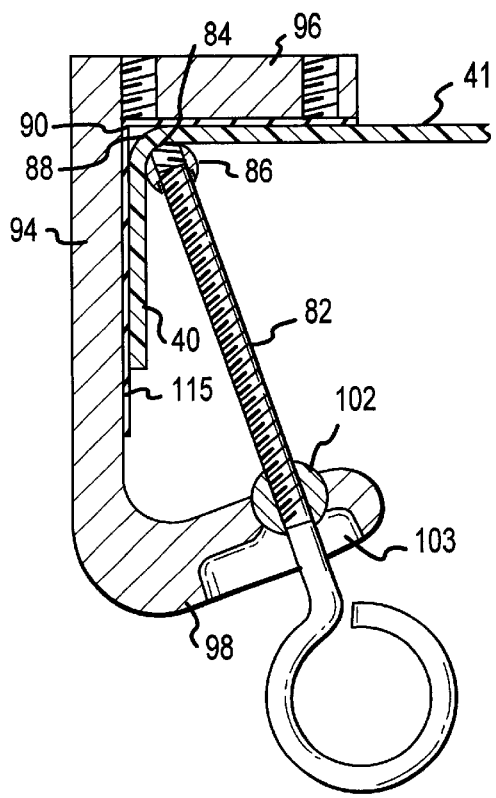
FIG. 9 is a vertical cross sectional view of the anchor clamp that is illustrated in FIG. 8, except that the cleat is not shown in FIG. 9.
Figure 10:
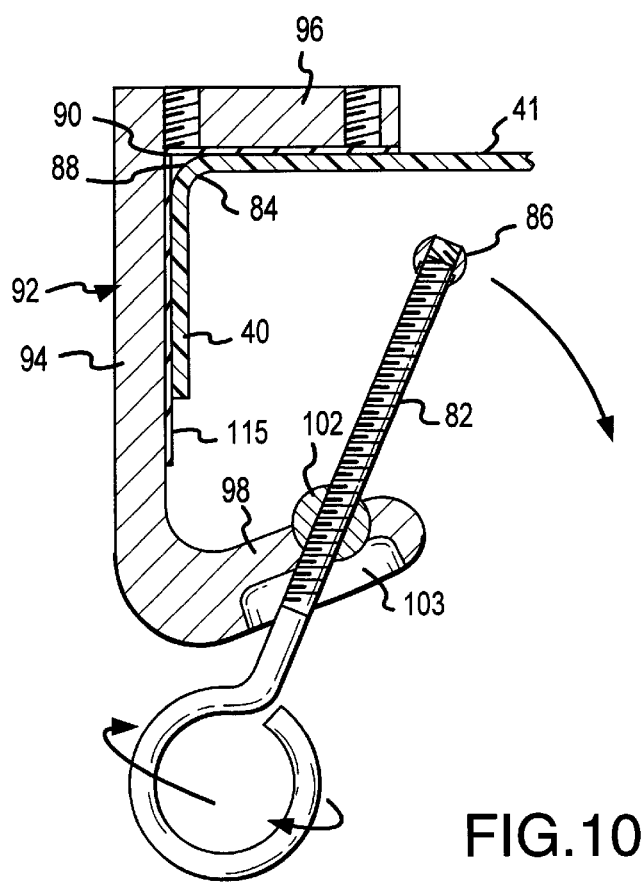
FIG. 10 is similar to FIG. 9 except that the threaded clamping stem is shown in a pivoted position away from its position as shown in FIG. 9.

In order to achieve the corner directed clamping action that is the object of this embodiment of the invention, it is necessary that the pad 86 on the tip of the threaded clamping stem 82 is directed toward the corner 90 of the clamp frame 92. This requires angulation of the threaded clamping stem 82. There are several ways in which the angular orientation of the stem 82 may be achieved. Where a lower projection of the frame is substantially perpendicular to the side wall, as the platform 22 is in the FIG. 5 embodiment, it is necessary to create an angularly oriented threaded bore in the platform to mount an angularly disposed threaded clamping stem. However, a simpler and structurally superior frame is produced by forming the lower projecting leg at an angle to the side wall, such as the projection 98 shown in FIGS. 8–12. Depending on the length of the side wall, but assuming proportions of the frame components as shown in FIGS. 9 and 10, an acute angle of approximately 75° between the leg 98 and the side wall 94 will provide a satisfactory orientation for the stem 82, provided that the stem is disposed 90° to the plane of the projecting leg 98. With this respective orientation the stem 82 is threaded through a perpendicular bore in the leg 98 in the same way as the threaded screw 24 engages the platform 22 in the FIG. 5 embodiment.

However, if the stem is limited to only longitudinal movement within a fixed position bore in the projecting leg, it is sometimes difficult to fit the anchor clamp around the down-turned edge of the top 41 of the truck bed side. Accordingly, the present embodiment provides for pivotal movement of the clamping stem 82 in order to get it out of the way during installation. Furthermore, the pivotal movement of the stem provides a means for self centering of the tip of the stem into a secure position in the bent corner of the truck bed's sheet metal structure. Pivotal movement of the stem 82 is achieved by threading the stem 82 through a bore in a cylinder 102 that is rotatably mounted in the lower projecting leg 98. In the design shown in FIGS. 9 and 10 it is necessary to provide a relieved portion 103 in the leg 98 beneath the cylinder 102 in order to provide clearance for the lower portion of the stem 82 as it is pivoted. Of course, the cylinder 102 could be large enough to span the width of the projecting leg 98 and the relieved, or cut-out portion 103, would be unnecessary in such case.

Figure 11:
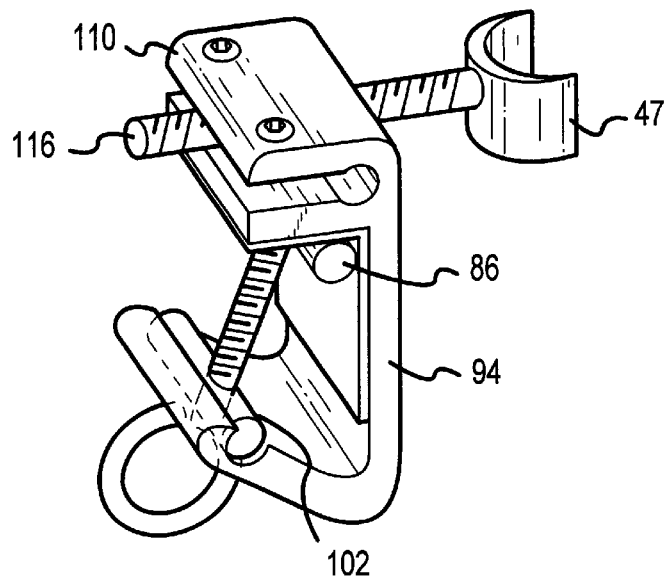
FIG. 11 is a perspective view of the anchor clamp of FIG. 8 except that the separate cleat shown in the FIG. 8 embodiment has been replaced with an integrally formed cleat.
Figure 12:
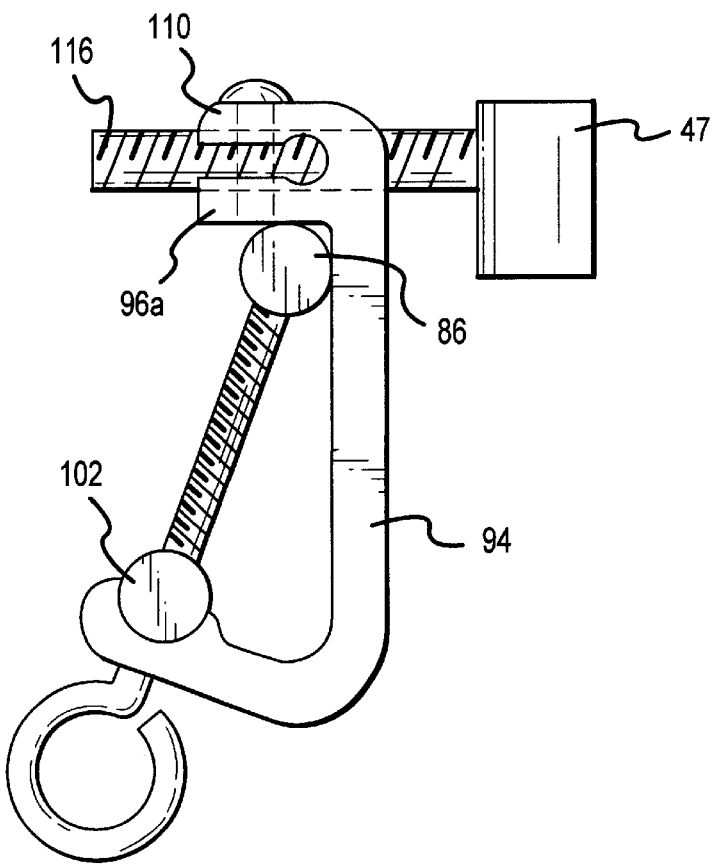
FIG. 12 is a vertical cross section of the anchor clamp shown in FIG. 11.

Instead of mounting a cleat 10 on the top of the projecting leg 96, it may be desirable to form the cleat 110 integrally with the projecting leg 96a, and the side wall portion 94, as shown in FIGS. 11 and 12. Such a construction eliminates the need for a separate cleat member. The cylindrical shaft 116 that supports the grommet 47 may be threaded into a transverse bore in the integral cleat 110 and the top of the projecting leg 96, as shown in FIG. 12. Alternatively, an unthreaded shaft can be slidably inserted into an unthreaded transverse bore in the integral cleat and the projecting leg, similar to the way in which the shaft 16 is mounted on the clamp of FIGS. 1–5.

Whether the shaft securing cleat is of the integral or separate type, the angularly disposed clamping stem that provides clamping pressure in the corner of the structure on which the clamp takes its bearing provides a secure base for the anchoring mechanism. In all of the embodiments of the invention the ultimate anchoring mechanism may be the shafts 16 and 116 or the "D" ring 58 or other equivalent type of connection to a load that is to be anchored. In addition, as with traditional "C" clamps, the "C" clamps of FIGS. 1–5, and the corner clamp of the present invention, the use of the clamp is not confined to the bed of a truck, but may be applied wherever its structure and function are advantageous.

I claim:

1. A clamp comprising,
   a frame having a width and comprising a side wall with first and second spaced apart unilaterally projecting legs, the side wall and the first projecting leg together defining an inside corner,
   a reciprocally movable stem being operably attached to the second projecting leg and having a distal tip that is directable to the inside corner.

2. The clamp of claim 1 and further including a bearing member rotatably mounted on the second projecting leg, said bearing member having a bore in which the stem is journaled.

3. The clamp of claim 1 where the second projecting leg is angularly disposed with respect to the first projecting leg.

4. The clamp of claim 3 and further including a bearing member rotatably mounted on the second projecting leg, said bearing member having a bore in which the stem is journaled.

5. The clamp of claims 2 and 4 where the bearing member is a cylinder with a diameter and a longitudinal axis and the bore therein is diametrically positioned.

6. The clamp of claim 5 where the longitudinal axis of the cylinder is parallel to the width of the frame.

7. The clamp of claim 1 and further including,
   a cleat superimposed above the first projecting leg.

8. The clamp of claim 7 where the cleat is integrally formed with the frame.

9. The clamp of claim 7 or 8 and further including,
   a transverse bore in at least one of either the first projecting leg or the cleat or both the first projecting leg and the cleat and disposed parallel to the first projecting leg and the cleat, defining with the cleat and the first projecting leg, a journal box.

10. The clamp of claim 9 and further including,
    means interconnecting the first projecting leg and the cleat.

11. The clamp of claim 10 and further including,
    a shaft journaled for rotation in the transverse bore and extending externally from at least one side of the journal box.

12. The clamp of claim 11, wherein the means interconnecting the cleat to the first projecting leg comprises screw means that engage the cleat and the first projecting leg for selectively adjusting the proximity of the cleat to the first projecting leg.

13. The clamp of claim 12 wherein the shaft is sized and dimensioned, with respect to the diameter of the bore, to permit the shaft to be selectively rotatable and longitudinally movable within the transverse bore or to be clamped in a fixed non rotating and non-movable position between the first projecting leg and the cleat by adjustment of the screw means.

14. The clamp of claim 13 wherein the portion of the shaft exterior of the journal box is "L" shaped, defining a transverse leg on an end of the shaft.

15. The clamp of claim 14 and further including tie means attached to the transverse leg for clasping another separate member.

16. The clamp of claim 9 and further including,
a "D" shaped ring having a straight stem portion that is journaled for rotation within the transverse bore.

17. A clamp comprising,
a frame generally defining a planar "C" shape, comprising a side wall with first and second spaced apart unilaterally projecting legs, the side wall and the first projecting leg together defining an inside corner,
a bearing supported by the second projecting leg for rotation about an axis that is perpendicular to the plane of the frame,
a longitudinally movable stem having a distal tip, said stem being mounted in the bearing and disposed perpendicularly to the axis of rotation of the bearing, said stem tip thereby being pivotally directable into the inside corner.

18. The clamp of claim 17 further including,
a cleat superimposed above the first projecting leg,
a transverse bore in at least one of either the first projecting leg or the cleat or both the first projecting leg and the cleat and disposed parallel to the first projecting leg and the cleat, defining with the cleat and the first projecting leg, a journal box.

19. The clamp of claim 18 and further including,
screw means interconnecting the first projecting leg and the cleat for selectively adjusting the proximity of the cleat to the first projecting leg.

20. The clamp of claim 19 and further including,
a shaft journaled for rotation in the transverse bore and extending externally from at least one side of the journal box wherein the shaft is sized and dimensioned, with respect to the diameter of the bore, to permit the shaft to be selectively rotatable and longitudinally movable within the transverse bore or to be clamped in a fixed non rotating and non-movable position between the first projecting leg and the cleat by adjustment of the screw means.

21. The clamp of claim 19 and further including,
a "D" shaped ring having a straight stem portion that is journaled for rotation within the transverse bore.

22. A clamping device comprising,
a rigid body member having spaced apart first and second laterally projecting legs, the first laterally projecting leg and the body member defining an interior corner angle having a vertex,
a reciprocally movable stem having a longitudinal axis,
pivotal means interconnecting the second laterally projecting leg and the reciprocally movable stem for selectively positioning the longitudinal axis of the reciprocally movable stem to intersect the vertex of the corner angle.

23. The clamping device of claim 22 where the reciprocally movable stem is a threaded tightening screw.

24. A cargo anchor primarily intended for attachment to an upper rolled edge of a side of a truck bed, comprising,
a journal box, having
a base member having a planar extent,
a cleat having a planar extent superimposed on the base member,
means for interconnecting the cleat to the base member,
a transverse bore in at least one of either the base member or the cleat and disposed parallel to the planes of the base member and the cleat, and
means for attaching the journal box to a flat structural member.

25. The apparatus of claim 24 and further including,
a shaft journalized for rotation in the transverse bore and extending externally from at least one side of the journal box.

* * * * *